United States Patent Office

Re. 28,167
Reissued Sept. 17, 1974

28,167

BLENDS OF POLYOLEFINS AND POLYAMIDES

Alberto Bonvicini, Terni, and Giuseppe Cantatore, Collescipoli, Italy, assignors to Montecatini Edison S.p.A., Milan, Italy No Drawing. Original No. 3,668,278, dated June 6, 1972, Ser. No. 76,646, Sept. 29, 1970. Application for reissue Nov. 13, 1972, Ser. No. 306,148
Claims priority, application Italy, Oct. 1, 1969, 22,766/69; Oct. 2, 1969, 22,830/69
Int. Cl. C08g *41/04*
U.S. Cl. 260—857 L 5 Claims

Matter enclosed in heavy brackets [ ] appears in the original patent but forms no part of this reissue specification; matter printed in italics indicates the additions made by reissue.

ABSTRACT OF THE DISCLOSURE

A new class of basic polyamides having a molecular weight between about 2,000 and 200,000. The polyamides are prepared by first reacting an acrylic or methacrylic ester with a monoamine and then further reacting the product obtainable with a polyamine. The polyamides are suitable for use as tinctorial modifiers for polymeric materials and particularly for crystalline polyolefins consisting essentially of isotactic macromolecules.

*CROSS-REFERENCES TO RELATED APPLICATIONS*

*This is an application for reissue of Letters Patent No. 3,668,278, issued on June 6, 1972, to Alberto Bonvicini and Giuseppe Cantatore.*

BACKGROUND OF THE INVENTION

1. Field of the Invention

This invention pertains to the field of tinctorial modifiers for polymeric materials. More particularly, this invention concerns the tinctorial modification of polymeric materials with basic polyamides.

2. Description of the Prior Art

Increasing the receptivity to dyes of articles manufactured from polyolefins consisting essentially of isotactic macromolecules, by mixing the polymers, before forming, with condensation resins characterized by the functional group —NHCO— is known.

Such resins, preferably having a low degree of condensation, are obtained from the polycondensation of higher amino acids, from the condensation of diamines with bicarboxylic acids, from the condensation of cyclic amides such as the ε-caprolactam (polyamides), or from the reaction of di-isocyanates with higher glycols (polyurethanes) and from the reaction of di-isocyanates with diamines (polyureas).

Similarly, the tinctorial modification of polypropylene by the addition of basic polyamides obtained by (1) the polycondensation of isocinchromeronic acid with diamines as described in Italian Pat. No. 692,162, (2) the polycondensation of N,N'-bis(ω-carboalkoxyalkyl) piperazine with a diamine as described in Italian Pat. No. 785,-574, and (3) the reaction of an acrylic or methacrylic ester with one or more polyamines, is known.

Also, in a series of articles in "Chimica e Industria" (March 1967, p. 271; May 1967, p. 453; June 1967, p. 587; August 1967, p. 826), a number of basic polyamides obtained by polycondensation of various diacrylyl derivatives with different amines have been described.

SUMMARY OF THE INVENTION

We have discovered a new class of basic polyamides and an economical process for preparation thereof. The polyamides of the present invention are suitable for use as tinctorial modifiers for polymers, particularly olefinic polymers. Thus, incorporation of the polyamides of the present invention into such a polymer renders the polymer particularly receptive to dyes of the acid, metallized and plastosoluble classes.

Additionally, we have found that when the basic polyamides of the present invention are incorporated into crystalline polyolefins consisting essentially of isotactic macromolecules, the workability of such mixes in the granulating, extrusion, stretching and textile finishing operations is substantially improved.

The polyamides of the present invention may be prepared by reacting a monoamine with an ester of acrylic or methacrylic acid and further reacting the product thus obtained with a polyamine. Preferably, the polyamides of the present invention have molecular weights in the range of from about 2,000 to 200,000.

The basic polyamides of the present invention have the formula:

(I)

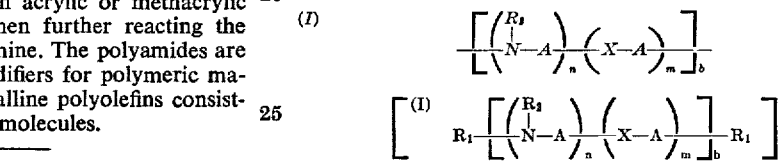

wherein:

n and m are integers from 1 to 99;
b is an integer;

N is nitrogen;
[$R_1$ is $NHR_3$
wherein $R_3$ is
hydrogen,
alkyl,
aryl selected from the group consisting of the phenyl and naphthyl series, lower cycloalkyl, or
$R_3$ and the nitrogen to which it is bonded taken together form a heterocyclic ring; or
$R_1$ is $COOR_4$ wherein $R_4$ is lower alkyl containing one to eight carbon atoms;]
$R_2$ is an
aliphatic radical,
cycloaliphatic radical, or
aromatic radical selected from the group consisting of the phenyl and naphthyl series,
which radical contains up to 30 carbon atoms;
A is

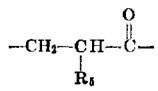

wherein $R_5$ is hydrogen or lower alkyl;
X is

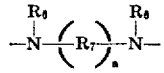

wherein $R_6$ is hydrogen or lower alkyl,
$R_7$ is
methylene,
arylene selected from the group consisting of the phenylene series, or
lower alkylenearylene wherein the arylene portion is selected from the group consisting of the phenylene series, and
a is an integer from 1 to 10; with the proviso that when a is 1, $R_7$ may also be (1) $—R_8—NH—R_8—$
wherein $R_8$ may be the same or different and is lower alkylene or $(R_9—NH—R_9)_z$ wherein $R_9$ is $—CH_2—$ or $—C_2H_4—$ and z is an integer from 1 to 5, or $R_7$ may also be
(2) a heterocyclic bivalent residue which may contain heteroatoms selected from the group consisting of nitrogen in the form of secondary or tertiary amine group, oxygen, sulfur, and phosphorus; or X is

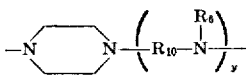

wherein
$R_6$ is as defined hereinabove
$R_{10}$ is $—CH_2—$ or $—C_2H_4—$, and
y is 0 or 1, and wherein $R_1$, $R_2$ ,A, X and b are such that the molecular weight of the polyamide is between about 2,000 and 200,000.

*While, as would be appreciated in this art, many different terminal groups could be introduced onto the polyamides of the present invention without substantially affecting the nature thereof or departing from this invention, and while it is the usual practice in the art to omit terminal groups from a description of long chain polymers, particularly since such groups are generally not detectable by routine analysis, nevertheless, for completeness, it will be understood that, as produced at the end of the condensation reaction, the polyamides can generally be represented as being terminated by terminals $R_1$, which may be the same or different, as in the following formula:*

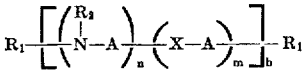

*wherein: n, m, b, N, $R_2$, A and X are as defined above and $R_1$ is $—NHR_3$; wherein $R_3$ is hydrogen, an alkyl radical, an aryl radical selected from the group consisting of radicals of the phenyl and naphthyl series, or cycloalkyl radical or $R_3$ and the nitrogen to which it is bonded, taken together, form a heterocyclic ring, or $R_1$ is $—COOR_4$ wherein $R_4$ is a lower alkyl radical containing 1 to 8 carbon atoms.*

DESCRIPTION OF THE PREFERRED EMBODIMENTS

Preferably, the portion of formula I designated:

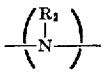

is a residue of a monoamine selected from the group consisting of methylamine, ethylamine, propylamine, butylamine, hexylamine, octylamine, dodecylamine, octadecylamine, cyclohexylamine, aniline, and p-toluidine.

Preferably, the portion of formula I designated:

—A— is a residue of methylacrylate, [ethylarcylate] *ethylacrylate,* methylmethacrylate, butylacrylate, butylmethacrylate or 2-ethylhexylacrylate.

Preferably, the portion of formula I designated:

—X— is a residue of a polyamine having the formula

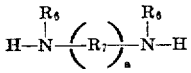

or

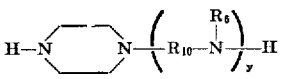

wherein $R_6$, $R_7$, $R_{10}$, a and y are as defined hereinabove.

Most preferably, the portion of formula I designated:

—X— is a residue of a polyamine selected from the group consisting of ethylenediamine, hexamethylenediamine, diethylenetriamine, tetraethylenepentamine, piperazine, N-(2-aminoethyl)piperazine, p-phenylenediamine, 4,4'-methylenedianiline, N,N'-dimethylhexamethylenediamine and N,N'-dibutylhexamethylenediamine.

The polyamides of the present invention may be easily and cheaply obtained by reacting an acrylic or methacrylic ester with aliphatic, cycloaliphatic or aromatic monoamines containing up to 30 carbons, such as, for instance: methylamine, ethylamine, propylamine, butylamine, hexylamine, octylamine, dodecylamine, octadecylamine, cyclohexylamine, aniline, and p-toluidine, and then reacting the product of that reaction with one or more polyamines.

Preferable acrylic esters are those with a low number of carbon atoms, such as: methylacrylate, ethylacrylate, and methylmethacrylate. However, acrylic esters with a greater number of carbon atoms such as, for example, butylacrylate, butylmethacrylate, 2-ethylhexylacrylate, and other like acrylic esters, may be used.

Preferably, the polyamine has the formula

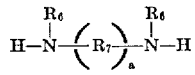

or

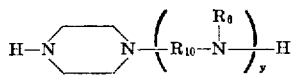

wherein $R_6$, $R_7$, $R_{10}$, a and y are as defined hereinabove.

Most preferably, the polyamine is selected from the group consisting of ethylenediamine, hexamethylenediamine, diethylenetriamine, tetraethylenepentamine, piperazine, N-(2-aminoethyl)piperazine, p-phenylenediamine, 4,4'-methylenedianiline, N,N'-dimethylhexamethylenediamine and N,N'-dibutylhexamethylenediamine.

The basic polyamides may be prepared in the presence or absence of solvents and/or condensing agents, by first reacting the acrylic or methacrylic ester with the aliphatic or aromatic monoamine containing up to 30 carbon atoms. The reaction product is then reacted with the polyamine by simply adding the polyamine to the reaction mixture. Both of the reactants, i.e., that of the acrylate with the monoamine and that of product thereof with the polyamine, may be carried out at temperatures ranging from room temperature to about 120° C.

The polycondensation is completed by heating at temperatures in the range between about 120° and 300° C. Also, a vacuum may be used in order to remove from the reaction system the alcohol that is released by the polycondensation.

The molar ratio between the acrylic ester or the methacrylic ester and the total amines is preferably 1:1. However, an excess of one or the other of the reactants may also be used. Preferably an excess of the total amines up to 30 percent is used.

The aliphatic, cycloaliphatic or aromatic monoamine containing up to 30 carbon atoms and the polyamine (or the mixture of several amines) may be present in the reaction mixture in a wide ratio to each other. With respect to the total amines, each amine, i.e., the monoamine and the polyamine, may, in fact, vary from 1–99 percent moles.

If desired, additional acrylate or monoamine may be added along with the polyamine.

Additionally, we have found that, when the polymer is a crystalline polyolefin consisting of isotactic macromolecules, the workability of the mix (i.e., with the polyamide of the present invention) is improved when the polyolefin is present in an amount from about 99–75 percent and preferably 98–90 percent by weight of the total mix and the polyamide is present in an amount from about 1–25 percent and preferably 2–10 percent by weight of the total mix.

Suitable for use with the polyamides of the present are, in general, crystalline polyolefins obtained from monomers of the formula $R—CH=CH_2$, wherein R is an alkyl or aryl group, or a hydrogen atom, and preferably is lower alkyl or an aryl group of the phenyl series. Particularly preferred are polyethylene, polypropylene, polybutene-1, poly-4-methylpentene-1, polystyrene and the like.

The polyamides of the present invention are also suitable tinctorial modifiers for fibrogenous polymers of a type other than olefinic polymers, such as, for example, acrylic polymers, e.g., polyacrylonitrile, vinyl polymers, e.g., polyvinyl chloride, polyesters, polyamides and the like.

Particularly suitable are those polyolefins consisting mainly of isotactic macromolecules obtained by low-pressure polymerization with stereospecific catalysts.

Preferably, the crystalline polyolefin used is polypropylene consisting essentially of isotactic macromolecules, obtained by the stereospecific polymerization of propylene, or a crystalline propylene-ethylene copolymer with a predominant propylene content.

The mixing of the basic polyamide with the polyolefin, according to this invention, is generally carried out by simple mixing together of the two materials in the form of powders.

It is possible, however, to carry out the addition with other methods, such as, for instance, the mixing of the olefinic polymer with a solution of the basic polyamide in a suitable solvent, followed by evaporation of the solvent itself or by adding the basic polyamide during or at the end of the polymerization. Additionally, it is also possible to directly mix the non-polycondensed reaction product of the reactants used for preparing the polyamide, with the polyolefin, by letting the polycondensation take place during the thermal treatments to which the polymer is subjected during the granulation and spinning operations.

The polyolefins may be in any form, depending on the desired end use, for example, films, strips, fibers and other formed objects.

When the polyolefin is to be in the form of a fiber, the mixes are first granulated and then extruded through suitable melt-spinning devices, operating in the absence of oxygen, but preferably in an atmosphere of inert gases (e.g., nitrogen).

During the mixing, additives, as is well known to the art, such as dulling agents, pigments, organic or inorganic dyestuffs, stabilizers, lubricants, dispersants and the like, may be blended in.

The yarns, after spinning, may be subjected to a stretching or drawing process with a stretch ratio of from about 1:2 to 1:20, at temperatures between about 80° and 150° C., in a stretching apparatus heated by hot air or by steam or a similar fluid, or fitted with heating plates. Alternatively, the fibers may be subjected to a strong orientation after extrusion by methods well known in the art for such purposes.

It is also preferable to subject the yarns to a sizing treatment (size stabilization) under free or impeded shrinkage, at about 80°–1 60 C., such sizing treatments being well known in the art.

The spinning may be carried out using conventional spinnerets, preferably spinnerets having holes with a diameter greater than about 0.5 millimeter and with a length/diameter ratio greater than about 1.1, but preferably between about 10 and 30. The holes of the spinnerets may have either circular or non-circular cross sections.

The dyeable compositions, according to this invention, also may be used in bicomponent fibers, e.g., either the inside or the outside lining of sheath-core fibers or in side-by-side fibers, or as a part of a conjugated fiber, e.g., a co-spun fiber. The yarns obtained may be either mono- or multi-filament and can be used for the preparation of either continuous filaments or staples, for the preparation of yarns or bulk staples, or for the preparation of non-woven structures, i.e., "spun bonded" and "non wovens."

The mono- or multi-filament fibers obtained according to this invention, if desired, may be subjected to further treatments with reactants capable of rendering the basic polyamides completely insoluble in water. Particularly suitable reactants for this purpose are mono- and di-epoxides, mono- and di-isocyanates, mono- and di-aldehydes, halogens, divinylbenzene and the like.

The fibers and other manufactured products may also be subjected to an acid treatment which will improve the dyeability and color fastness. These treatments can be carried out either before or after the stretching operation.

The fibers obtained according to this invention possess excellent receptivity towards the dyes belonging to the classes of acid, metallized and plastosoluble dyes, and fibers thus dyed possess a good stability and particularly good light fastness.

The following examples further illustrate our invention.

In the examples, the dyeing operations were carried out for 1½ hours at the boiling point, in dyeing baths containing 2.5 percent of dye (acid, pre-metallized or plastosoluble) based on the weight of the fibers, with a fiber/bath ratio of 1:40.

The dyeings with acid and pre-metallized dyes were conducted in the presence of 1 percent by weight, based on the weight of the fiber, of a surfactant consisting of the product of condensation of ethylene oxide with an alkylphenol or of the sodium salt of N-oleyl-N-methyltaurine. 30 minutes after the start of the boiling, 2 percent, based on the weight of the fiber, of a 20 percent solution of acetic acid was added in order to improve the exhaustion of the baths.

The dyeings with plastosoluble dyes were conducted in the presence of 2 percent of surfactant and 3 percent of ammonium acetate, based on the weight of the fiber.

After the dyeing, the yarns were rinsed with running water. The rinsed yarns appeared intensely dyed, both with the acid and the premetallized dyes as well as with the plastosoluble dyes.

The light fastness, resistance to washing and rubbing of the dyed material proved fully satisfactory.

EXAMPLE 1

269 g. (1 mole) of octadecylamine and 172 g. (2 moles) of methylacrylate were heated with stirring, under a nitrogen atmosphere, at a temperature of 100° C. for 2 hours. To this mixture were then added 129 g. (1 mole) of N-(2-aminoethyl)-piperazine and the whole was then further heated at 100° C. for 2 hours, at 120° C. for 2 hours, at 150° C. for 1 hour and at 180° C. for 1 hour, removing the methanol formed during the reaction. The reaction mixture was further treated for 1 hour at 180° C. under vacuum.

The product obtained was a solid, basic polyamide having a yellowish color, an *inherent* [intrinsic] viscosity ($\eta$) of 0.08 dl./g., measured in a 0.5 percent isopropanol solution, a melting point of 120° C., and titratable nitrogen of 5.4 percent (calculated=5.5 percent).

EXAMPLE 2

185 g. (1 mole) of dodecylamine and 172 g. (2 moles) of methyl acrylate were heated with stirring, under a nitrogen atmosphere, at 100° C. for 2 hours. To this mixture were then added 129 g. (1 mole) of N-(2-aminoethyl)piperazine. The whole mixture was further heated at 100° C. for 2 hours, at 120° C. for 2 hours, at 150° C. for 1 hour and at 180° C. for 1 hour, removing all the methanol formed during the reaction. The reaction mixture was further treated at 180° C. for 1 hour, under vacuum.

The basic polyamide thus obtained was a semi-solid product having a light yellow color, with a titratable nitrogen of 6.5 percent (calculated=6.6 percent).

EXAMPLE 3

269 g. (1 mole) of octadecylamine and 172 g. (2 moles) of methyl acrylate were heated with stirring, in a nitrogen current, at 100° C. for 2 hours. To this mixture were then added 208 g. (1.1 moles) of tetraethylenepentamine, and the whole was heated at 100° C. for 2 hours, at 120° C. for 2 hours, at 150° C. for 1 hour and at 180° C. for 1 hour, removing the methanol that had formed during the reaction. The reaction mixture was further treated for 1 hour under vacuum at 180° C.

The basic polyamide thus obtained was a yellow solid having a titratable nitrogen of 10.0 percent (calculated =10.0 percent).

EXAMPLE 4

80.7 g. (0.3 moles) of octadecylamine and 51.6 g. (0.6 moles) of methyl acrylate were heated with stirring, *in* a nitrogen current, at 100° C. for 2 hours. To this mixture were then added 129 g. (1 mole) of N-(2-aminoethyl) piperazine and 60.2 g. (0.7 mole) of methyl acrylate. The whole was then heated at 100° C. for 2 hours, at 120° C. for 2 hours, at 150° C. for 1 hour and at 180° C. for 1 hour, removing the methanol that had formed during the reaction. The reaction mixture was further treated for 1 hour at 180° C. under vacuum.

The basic polyamide thus obtained was a light yellow solid, having an *inherent* [intrinsic] viscosity ($\eta$) of 0.08 dl./g. (measured in a 0.5 percent isopropanol solution) and a titratable nitrogen of 9.85 percent (calculated=10.0 percent).

EXAMPLE 5

55.5 g. (0.3 mole) of dodecylamine and 51.6 g. (0.6 mole) of methyl acrylate were heated with stirring, in a nitrogen current, at 100° C. for 2 hours. To this mixture were then added 129 g. (1 mole) of N-(2-aminoethyl) piperazine and 60.2 g. (0.7 mole) of methyl acrylate. The whole was then heated at 100° C. for 2 hours, 120° C. for 2 hours, at 150° C. for 1 hour and at 180° C. for 1 hour, removing the methanol that had formed during the reaction. The reaction mixture was further treated for 1 hour at 180° C. under vacuum.

The basic polyamide thus obtained was a waxy solid product having a light yellow color, an *inherent* [intrinsic] viscosity ($\eta$) of 0.08 dl./g. (measured in a 0.5 percent isopropanol solution) and a titratable nitrogen of 10.90 percent (calculated=11.0 percent).

EXAMPLE 6

80.7 g. (0.3 mole) of octadecylamine and 60 g. (0.6 mole) of methylmethacrylate were heated with stirring in a nitrogen current for 2 hours at 100° C. To this mixture were then added 129 g. (1 mole) of N-(2-aminoethyl)piperazine and 70 g. (0.7 mole) of methylmethacrylate. The whole was then heated for 2 hours at 100° C., for 2 hours at 120° C., for 1 hour at 150° C. and for 1 hour at 180° C., removing all the methanol that had formed during the reaction. The reaction mixture was further treated for 1 hour at 180° C. under vacuum.

The basic polyamide thus obtained was a light yellow solid having an *inherent* [intrinsic] viscosity ($\eta$) of 0.06 dl./g. (measured in a 0.5 percent isopropanol solution) the titratable nitrogen being 9.35 percent (calculated=9.4 percent).

EXAMPLE 7

80.7 g. (0.3 mole) of octadecylamine and 51.6 g. (0.6 mole) of methyl acrylate were heated with stirring in a nitrogen current for 2 hours at 100° C. To this mixture were then added 64.5 g. (0.5 mole) of N-(2-aminoethyl)piperazine, 94.5 g. (0.5 mole) of tetraethylenepentamine and 60.2 g. (0.7 mole) of methyl acrylate, and the whole was then further heated for 2 hours at 100° C., for 2 hours at 120° C., for 1 hour at 150° C., and for 1 hour at 180° C., removing all the methanol that had formed during the reaction. The mixture was then treated for 1 hour at 180° C. under vacuum.

The basic polyamide thus obtained was a light yellow solid having an *inherent* [intrinsic] viscosity ($\eta$) of 0.10 dl./g. (measured on a solution of 0.5 percent in isopropanol) and a titratable nitrogen of 12.2 percent (calculated=12.2 percent).

EXAMPLE 8

80.7 g. (0.3 mole) of octadecylamine and 51.6 g. (0.6 mole) of methyl acrylate were heated with stirring in a current of nitrogen for 2 hours at 100° C. To this mixture were then added 60 g. (1 mole) of ethylenediamine and 60.2 g. (0.7 mole) of methyl acrylate, and the whole was then heated for 2 hours at 100° C., for 2 hours at 120° C., for 1 hour at 150° C. and for 1 hour at 180° C., removing the methanol that had formed during the reaction. The mixture was then further treated for 1 hour at 180° C. under vacuum.

The basic polyamide thus obtained was a light yellow solid having an *inherent* [intrinsic] viscosity ($\eta$) of 0.06 dl./g. (measured in a 0.5 percent isopropanol solution), the titratable nitrogen being 8.4 percent (calculated=8.6 percent).

EXAMPLE 9

53.8 g. (0.2 mole) of octadecylamine and 34.4 g. (0.4 mole) of methyl acrylate were heated with stirring in a current of nitrogen for 2 hours at 100° C. To this mixture were then added 129 g. (1 mole) of N-(2-aminoethyl)piperazine and 68.8 g. (0.8 mole) of methyl acrylate, and the whole was then heated for 2 hours at 100° C., for 2 hours at 120° C., for 1 hour at 150° C. and for 1 hour at 180° C., removing the methanol that had formed during the reaction. The mixture was further treated for 1 hour at 180° C. under vacuum.

The basic polyamide thus obtained was a light yellow solid product having an *inherent* [intrinsic] viscosity ($\eta$) of 0.11 dl./g. (measured in a 0.5 percent isopropanol solution), the titratable nitrogen being 11.2 percent (calculated=11.3 percent).

EXAMPLE 10

80 g. of a basic polyamide, obtained as described in Example 1, were mixed together with 920 g. of crystalline polypropylene consisting essentially of isotactic macromolecules (having a melt index of 22.5, an ash content of 0.009 percent and a residue after heptane extraction of 97.2 percent).

This mixture was then extruded at 220° C., and the granulate obtained was transformed into fibers under the following conditions:

| | |
|---|---|
| Spinning: | |
| Temperature of worm screw | 230° C. |
| Temperature of extruding head | 230° C. |
| Temperature of spinneret | 235° C. |
| Spinneret | 60 holes, each having a diameter of 0.8 and a length of 16 mm. |
| Maximum pressure | 50 kg./sq. cm. |
| Winding speed | 400 m./min. |
| Stretching (Drawing): | |
| Temperature | 130° C. |
| Medium | Steam. |
| Stretching ratio | 1:5. |

The fibers obtained possessed a good affinity towards the following dyestuffs:

| | |
|---|---|
| Red for Wool B | (C.I. acid red 115). |
| Alizarine Blue SE | (C.I. acid blue 43). |
| Lanasyn Red 2GL | (C.I. acid red 216). |
| Lanasyn Brown 3RL | (C.I. acid brown 30). |

The dyed fibers possessed good light fastness and good fastness to washing and rubbing.

EXAMPLE 11

70 g. of basic polyamide, obtained according to Example 2, were mixed together with 930 g. of crystalline polypropylene consisting essentially of isotactic macromolecules having a melt index of 22.5, an ash content of 0.009 percent and a residue after heptane extraction of 97.2 percent.

The mixture was extruded at 220° C., and the granulate obtained was transformed into fibers under the following conditions:

| | |
|---|---|
| Spinning: | |
| Temperature of worm screw | 235° C. |
| Temperature of extruding head | 240° C. |
| Temperature of spinneret | 240° C. |
| Spinneret | 60 holes, each having a diameter of 0.8 mm. and a length of 16 mm. |
| Winding speed | 400 m./min. |
| Stretching: | |
| Temperature | 130° C. |
| Medium | Steam. |
| Stretching ratio | 1:5. |

The fibers obtained possessed a good affinity towards the dyes listed in Example 10. The dyed fibers possessed good light fastness and good resistance to washing and rubbing.

EXAMPLE 12

50 g. of basic polyamide, obtained according to Example 3, were mixed together with 950 g. of crystalline polypropylene consisting essentially of isotactic macromolecules having a melt index of 22.5, an ash content of 0.009 percent and a residue after heptane extraction of 97.2 percent.

The mixture was extruded at 220° C., and the granulate obtained was transformed into fibers under the following conditions:

| | |
|---|---|
| Spinning: | |
| Temperature of worm screw | 240° C. |
| Temperature of extruding head | 240° C. |
| Temperature of spinneret | 245° C. |
| Spinneret | 60 holes, each having a diameter of 0.8 mm. and a length of 16 mm. |
| Maximum pressure | 51 kg./sq. cm. |
| Winding speed | 400 m./min. |
| Stretching: | |
| Temperature | 130° C. |
| Medium | Steam. |
| Stretching ratio | 1:5. |

The fibers obtained possessed good affinity towards the dyes listed in Example 10. The dyed fibers possessed good light fastness and good resistance to washing and rubbing.

EXAMPLE 13

50 g. of a basic polyamide, obtained by reacting 80.7 g. (0.3 moles) of octadecylamine, 11.8 g. (1.3 moles) of methylacrylate and 129 g. (1 mole of N-(2-aminoethyl)-piperazine, were mixed together with 950 g. of crystalline polypropylene consisting essentially of isotactic macromolecules (melt index of 22.5, an ash content of 0.009 percent, and residue after heptane extraction of 97.2 percent).

This mixture was extruded at 220° C., and the granulate obtained was transformed into fibers under the following conditions:

| | |
|---|---|
| Spinning: | |
| Temperature of the worm screw | 230° C. |
| Temperature of extruding head | 230° C. |
| Temperature of spinneret | 240° C. |
| Spinneret | 60 holes, each having a diameter of 0.8 mm and a length of 16 mm. |
| Maximum pressure | 50 kg./sq. cm. |
| Winding speed | 400 m./min. |
| Stretching: | |
| Temperature | 130° C. |
| Medium | Steam. |
| Stretching ratio | 1:5. |

The fibers obtained possessed a good affinity towards the dyes listed in Example 10. The dyed fibers possessed good light fastness and good resistance to washing and rubbing.

EXAMPLE 14

40 g. of a basic polyamide, obtained by reacting 55.5 g. (0.3 moles) of dodecylamine, 111.8 g. (1.3 moles) of methylacrylate and 129 g. (1 mole) of N-(2-aminoethyl)-piperazine, were mixed together with 960 g. of crystalline polypropylene consisting essentially of isotactic macromolecules (melt index of 22.5, an ash content of 0.009 percent, and residue after heptane extraction of 97.2 percent).

The mixture was extruded at 220° C., and the granulate obtained was transformed into fibers under the following conditions:

| | |
|---|---|
| Spinning: | |
| Temperature of worm screw | 235° C. |
| Temperature of extruding head | 235° C. |
| Temperature of spinneret | 240° C. |
| Spinneret | 60 holes, each having a diameter of 0.8 mm and a length of 16 mm. |
| Maximum pressure | 52 kg./sq. cm. |
| Winding speed | 400 m./min. |
| Stretching: | |
| Temperature | 130° C. |
| Medium | Steam. |
| Stretching ratio | 1:5. |

The fibers obtained possessed good affinity towards the dyes listed in Example 10. The fibers thus dyed possessed good light fastness and good resistance to washing and rubbing.

EXAMPLE 15

50 g. of a basic polyamide, obtained by reacting 80.7 g. (0.3 moles) of octadecylamine, 130 g. (1.3 moles) of methylmethacrylate and 129 g. (1 mole) of N-(2-aminoethyl)piperazine, were mixed together with 950 g. of crystalline poplyproplene consisting essentially of isotactic macromolecules having a melt index of 22.5, an ash content of 0.009 percent and a residue after heptane extraction of 97.2 percent.

This mixture was extruded at 210° C., and the graduate obtained was transformed into fibers under the following conditions:

| | |
|---|---|
| Spinning: | |
| Temperature of worm screw | 230° C. |
| Temperature of extruding head | 235° C. |
| Temperature of spinneret | 240° C. |
| Spinneret | 60 holes, each having a diameter of 0.8 mm. and a length of 16 mm. |
| Maximum pressure | 50 kg./sq. cm. |
| Winding speed | 400 m./min. |

EXAMPLE 15—Continued

Stretching:

| | |
|---|---|
| Temperature | 130° C. |
| Medium | Steam. |
| Stretching ratio | 1:5. |

The fibers thus obtained possessed good affinity towards the dyes listed in Example 10. The dyed fibers possessed good light fastness and good resistance to washing and rubbing.

EXAMPLE 16

40 g. of a basic polyamide, obtained by reacting 80.7 g. (0.3 moles) of octadecylamine, 111.8 g. (1.3 moles) of methylacrylate, 64.5 g. (0.5 moles) of N-(2-aminoethyl)-piperazine and 94.5 g. (0.5 moles) of tetraethylenepentamine, were mixed together with 960 g. of crystalline polypropylene consisting essentially of isotactic macromolecules having a melt index of 22.5, an ash content of 0.009 percent and a residue after heptane extraction of 97.2 percent.

This mixture was extruded at 220° C., and the granulate obtained was transformed into fibers under the following conditions:

Spinning:

| | |
|---|---|
| Temperature of worm screw | 240° C. |
| Temperature of extruding head | 240° C. |
| Temperature of spinneret | 245° C. |
| Spinneret | 60 holes, each having a diameter of 0.8 mm. and a length of 16 mm. |
| Maximum pressure | 50 kg./sq. cm. |
| Winding speed | 400 m./min. |

Stretching:

| | |
|---|---|
| Temperature | 130° C. |
| Medium | Steam. |
| Stretching ratio | 1:5. |

The fibers obtained possessed good affinity towards the dyes listed in Example 10. The dye fibers possessed good light fastness and good resistance to washing and rubbing.

EXAMPLE 17

50 g. of a basic polyamide, obtained by reacting 80.7 g. (0.3 moles) of octadecylamine, 111.8 g. (1.3 moles) of methylacrylate and 60 g. (1 mole) of ethylenediamine, were mixed together with 950 g. of crystalline polypropylene consisting essentially of isotactic macromolecules having a melt index of 22.5, an ash content of 0.009 percent, and a residue after heptane extraction of 97.2 percent.

This mixture was extruded at 220° C., and the granulate obtained was transformed into fibers under the following conditions:

Spinning:

| | |
|---|---|
| Temperature of worm screw | 235° C. |
| Temperature of extruding head | 235° C. |
| Temperature of spinneret | 240° C. |
| Spinneret | 60 holes, each having a diameter of 0.8 mm. and a length of 16 mm. |
| Maximum pressure | 50 kg./sq. cm. |
| Winding speed | 400 m./min. |

Stretching:

| | |
|---|---|
| Temperature | 130° C. |
| Medium | Steam. |
| Stretching ratio | 1:5. |

The fibers obtained possessed good affinity towards the dyes listed in Example 10. The dyed fibers possessed good light fastness and good resistance to washing and rubbing.

EXAMPLE 18

40 g. of a basic polyamide, obtained by reacting 53.8 g. (0.2 moles) of octadecylamine, 103.2 g. (1.2 moles) of methylacrylate and 129 g. (1 mole) of N-(2-aminoethyl)piperazine, were mixed together with 960 g. of crystalline polypropylene consisting essentially of isotactic macromolecules having a melt index of 22.5, an ash content of 0.009 percent, and a residue after heptane extraction of 97.2 percent.

The mixture was extruded at 220° C., and the granulate obtained was transformed into fibers under the following conditions:

Spinning:

| | |
|---|---|
| Temperature of worm screw | 235° C. |
| Temperature of extruding head | 240° C. |
| Temperature of spinneret | 245° C. |
| Spinneret | 60 holes, each having a diameter of 0.8 mm. and a length of 16 mm. |
| Maximum pressure | 50 kg./sq. cm. |
| Winding speed | 400 m./min. |

Stretching:

| | |
|---|---|
| Temperature | 130° C. |
| Medium | Steam. |
| Stretching ratio | 1:5. |

The fibers obtained possessed good affinity towards the dyes listed in Example 10. The dyed fibers possessed good light fastness and good resistance to washing and rubbing.

Variations can, of course, be made without departing from the spirit and scope of the invention.

Having thus described the invention, what is desired to be secured by Letters Patent and hereby claimed is:

We claim:

1. A dyeable polymeric composition comprising a blend of from about 99–75 percent by weight of a crystalline polyolefin consisting essentially of isotactic macromolecules and from about 1–25 percent by weight of a basic polyamide, the monomeric units of which may be the same or different, said polyamide having the formula:

(I)

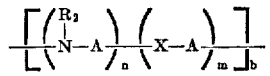

(I)

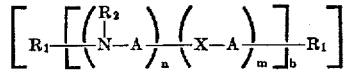

wherein:

n and m are integers from 1 to 99;

b is an integer;

N is nitrogen;

[$R_1$ is $NHR_3$ wherein $R_3$ is hydrogen, an alkyl radical, an aryl radical selected from the group consisting of radicals of the phenyl and naphthyl series, or a lower cycloalkyl radical; or $R_3$, together with the nitrogen, form a heterocyclic ring; or $R_1$ is $COOR_4$ wherein $R_4$ is lower alkyl containing one to eight carbon atoms;]

$R_2$ is an aliphatic radical, a cycloaliphatic radical, or an aromatic radical selected from the group consisting of radicals of the phenyl and naphthyl series, which radical contains up to 30 carbon atoms;

A is

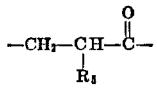

wherein $R_5$ is hydrogen or a lower alkyl radical;

X is

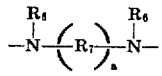

wherein $R_6$ is hydrogen or a lower alkyl radical, $R_7$ is a methylene radical, an arylene radical selected from the group consisting of radicals of the phenylene series, or a lower alkylenearylene radical wherein the arylene portion is selected from the group consisting of radicals of the phenylene series, and a is an integer from 1 to 10; with the proviso that when a is 1, $R_7$ may also be $$—R_8—NH—R_8—$$

wherein $R_8$ may be the same or different and is a lower alkylene radical, or $$(R_9—NH—R_9)_z$$

wherein $R_9$ is $—CH_2—$ or $—C_2H_4—$ and z is an integer from 1 to 5; or $R_7$ may be a bivalent heterocyclic residue which may contain heteroatoms selected from the group consisting of nitrogen in the form of secondary or tertiary amine groups, oxygen, sulfur and phosphorus; or X is

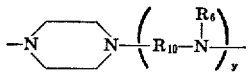

wherein $R_6$ is as defined hereinabove, $R_{10}$ is $—CH_2—$ or $—C_2H_4—$, and y is 0 or 1, the molecular weight of the polyamide being between about 2,000 and 200,000.

2. The composition of claim 1, wherein the polyolefin is polyethylene, polypropylene, polybutene-1, poly-4-methylpentene-1, polystyrene or a crystalline ethylene-propylene copolymer having a predominant amount of propylene.

3. A dyeable composition comprising from about 99–75 percent by weight of a crystalline polyolefin consisting essentially of isotactic macromolecules, said polyolefin being selected from the group consisting of polyethylene, polypropylene, polybutene-1, poly-4-methylpentene-1, polystyrene and a crystalline ethylene-propylene copolymer having a predominant amount of propylene, and from about 1–25 percent by weight of the basic polyamide as defined in claim 1, wherein:

a. that portion of formula I designated:

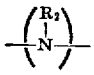

is a residue of a monoamine selected from the group consisting of methylamine, ethylamine, propylamine, butylamine, hexylamine, octylamine, dodecylamine, octadecylamine, cyclohexylamine, aniline, and p-toluidine;

b. that portion of formula I designated:

—A— is a residue of methylacrylate, ethylacrylate, methylmethacrylate, butylacrylate, butylmethacrylate or 2-ethylhexylacrylate; and c. that portion of formula I designated:

—X— is a residue of a polyamide selected from the group consisting of ethylenediamine, hexamethylenediamine, *diethylenetriamine* [diethylentriamine], tetraethylenepentamine, piperazine, N-(2-aminoethyl) piperazine, [p-phenylenediamine, 4,4'-methylenediamiline, N, N'-] *p-phenylenediamine, 4,4'-methylenedianiline, N,N'*-dimethylhexa - methylenediamine and N,N'-dibutylhexamethylenediamine.

4. The polymeric composition of claim 3, in the form of fibers, films, strips, or shaped articles.

*5. The composition of claim 1, wherein the basic polyamide has terminal groups of the formula $R_1$, wherein $R_1$ is $—NHR_3$; wherein $R_3$ is hydrogen, an alkyl radical, an aryl radical selected from the group consisting of radicals of the phenyl and naphthyl series, or cycloalkyl radical or $R_3$ and the nitrogen to which it is bonded, taken together, form a heterocyclic ring, or $R_1$ is $—COOR_4$ wherein $R_4$ is a lower alkyl radical containing 1 to 8 carbon atoms.*

References Cited

The following references, cited by the Examiner, are of record in the patented file of this patent or the original patent.

FOREIGN PATENTS

| | | | |
|---|---|---|---|
| 873,830 | 7/1961 | Great Britain | 260—857 L |
| 686,378 | 5/1961 | Canada | 260—857 L |

PAUL LIEBERMAN, Primary Examiner

U.S. Cl. X.R.

161—173, 175; 260—2 R, 85.7, 857 UN, 857 PE. 857 TW, 860, 873, 898, 899, 901, 78 A,

PO-1050
(5/69)

UNITED STATES PATENT OFFICE
CERTIFICATE OF CORRECTION 201-24 Re
Patent No. Re. 28,167 Dated September 17, 1974

Inventor(s) Alberto BONVICINI and Giuseppe CANTATORE

It is certified that error appears in the above-identified patent and that said Letters Patent are hereby corrected as shown below:

Column 1, line 9: "22,766/69" and "22,830/69" should read -- 22,766 A/69 -- and -- 22,830 A/69 --.

Column 3, line 10: "group," should read -- groups, --.

Column 4, line 48: "reactants," should read -- reactions, --

Column 5, line 63: "80°-1 60°C." should read -- 80°-160 C.--

Column 9, line 43: "The" should read -- This --. Column 9, line 70: "(1 mole" should read -- (1 mole) --.

Column 10, line 63: "graduate" should read -- granulate --.

Column 14, line 15: "polyamide" should read -- polyamine --.

Signed and sealed this 3rd day of December 1974.

(SEAL)
Attest:

McCOY M. GIBSON JR.
Attesting Officer

C. MARSHALL DANN
Commissioner of Patents

PR